Oct. 3, 1950 E. E. JOHNSON 2,524,170
LATHE TOOL SUPPORT
Filed Nov. 25, 1947 2 Sheets-Sheet 1

INVENTOR.
ERNEST E. JOHNSON,
BY
McMorrow, Berman + Davidson
ATTORNEYS.

Oct. 3, 1950     E. E. JOHNSON     2,524,170
LATHE TOOL SUPPORT
Filed Nov. 25, 1947     2 Sheets-Sheet 2
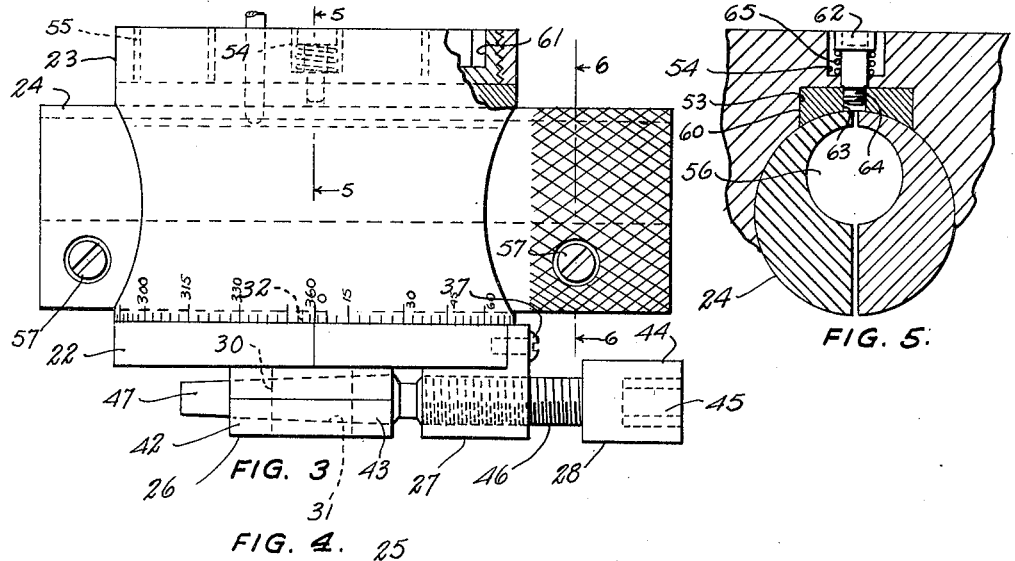
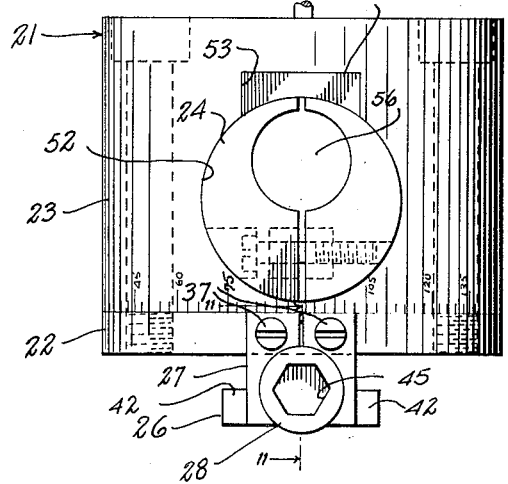
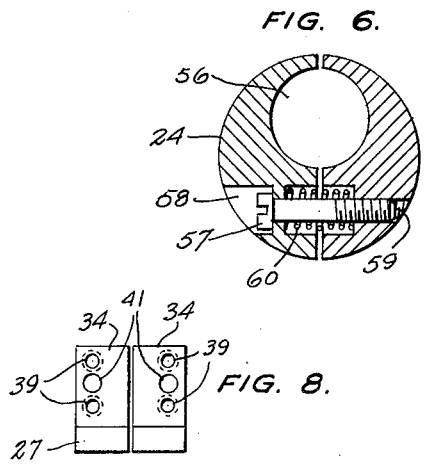
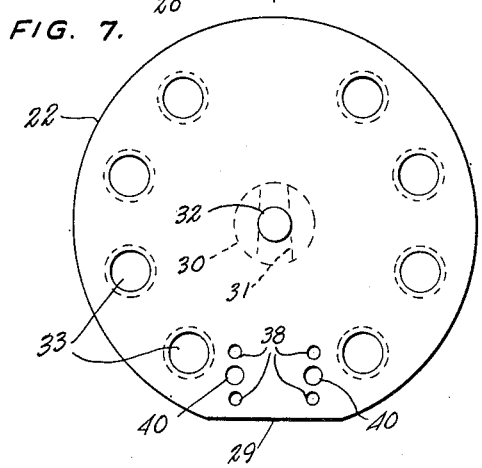
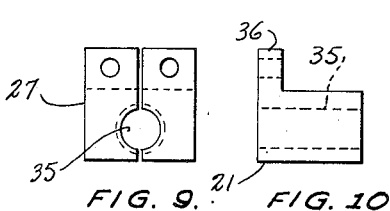
INVENTOR.
ERNEST E. JOHNSON,
BY
McMorrow, Berman & Davidson
ATTORNEYS.

Patented Oct. 3, 1950

2,524,170

UNITED STATES PATENT OFFICE 2,524,170

LATHE TOOL SUPPORT

Ernest E. Johnson, Jamestown, Ind.

Application November 25, 1947, Serial No. 787,983

4 Claims. (Cl. 82—36)

This invention relates to improvements in lathe tool supports, and more particularly to an adjustable support for a boring bar or similar tool.

It is among the objects of the invention to provide an improved tool support adapted to be mounted on the compound slide or rest of a conventional lathe for rotational adjustment about an axis substantially at right angles to the axis of rotation of the lathe chuck or spindle, and movable along the bed, cross-way and compound slideway of the lathe, and including means operative for eccentric adjustment of the tool relative to said rotational axis of the lathe chuck for accurate positioning of the tool relative to a work piece supported in the chuck, and for boring, chamfering, grooving and facing said work piece at desired angles.

A further object resides in the provision of improved guideway engaging means for quickly and securely locking a tool support on the compound slide of a lathe, of means independent of such locking means for securely clamping the tool in any desired position of eccentric adjustment in said support, and of means independent of both said locking and said clamping means operative to hold said support in any desired position of rotational adjustment about an axis disposed substantially at right angles to the rotational axis of the lathe chuck.

A still further object resides in the provision of a lathe tool holder including independent means providing for movements of adjustment of said tool eccentrically of the rotational axis of the lathe chuck, rotationally about an axis substantially at right angles to such rotational axis, and translatory of the lathe compound slide guideway, and separate locking means for securing said tool in any desired position of adjustment in all of the three different ranges of adjustable movements.

An additional object resides in the provision of an improved lathe tool holder which is simple and economical in construction, may be attached to a conventional lathe without modification of any part of the lathe, provides at least three ranges of adjustable movement for a tool supported thereby, is simple to install and easy to adjust, and is effective to firmly hold the tool in adjusted position during operation of the lathe.

Other objects and advantages will become apparent from a consideration of the following description in conjunction with the accompanying drawings, wherein:

Figure 3 is a side elevation of the tool support illustrated in Figure 2;

Figure 4 is a side elevation of the tool support substantially at right angles to the side elevation shown in Figure 3, and looking at the right-hand side of the tool support as illustrated in Figure 3;

Figure 5 is a transverse cross-section of a fragmentary portion of the tool support illustrated in Figure 3, taken substantially on the line 5—5 of Figure 3;

Figure 6 is a transverse cross-section of an eccentric sleeve constituting a component of the support illustrated in Figure 3, and taken substantially on the line 6—6 of Figure 3;

Figure 7 is a top plan view of the base component of the tool support illustrated in Figures 3 and 4;

Figure 8 is a top plan view of a split nut secured to the base;

Figure 9 is an end elevation of the split nut;

Figure 10 is a side elevation of the split nut;

Figure 11:
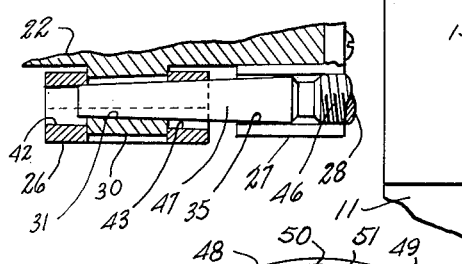
Figure 2:
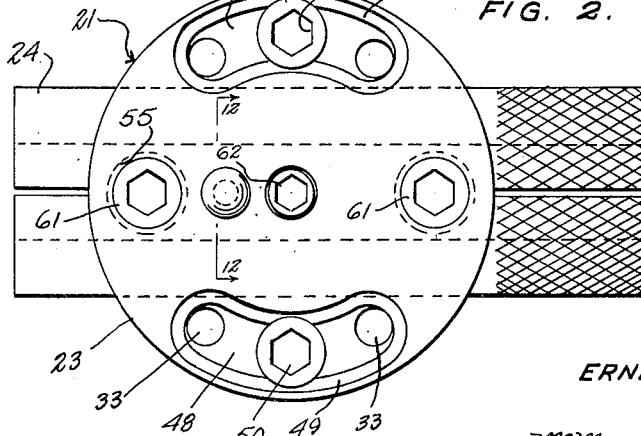
Figure 2 is a top plan view on a somewhat enlarged scale of the tool support illustrated in Figure 1, the lathe tool itself being omitted from the assembly.
Figure 12:
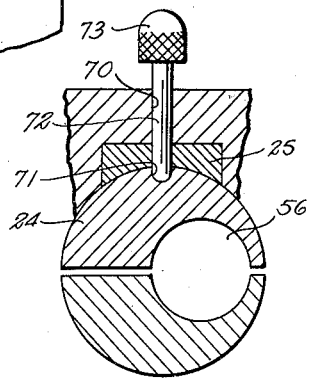

Figure 11 is a longitudinal cross-section of the slide groove block assembly shown at the bottoms of Figures 3 and 4, and taken substantially on the line 11—11 of Figure 4, and Figure 12 is a fragmentary, transverse cross-section taken substantially on the section line 12—12 of Figure 2.

Figure 1:
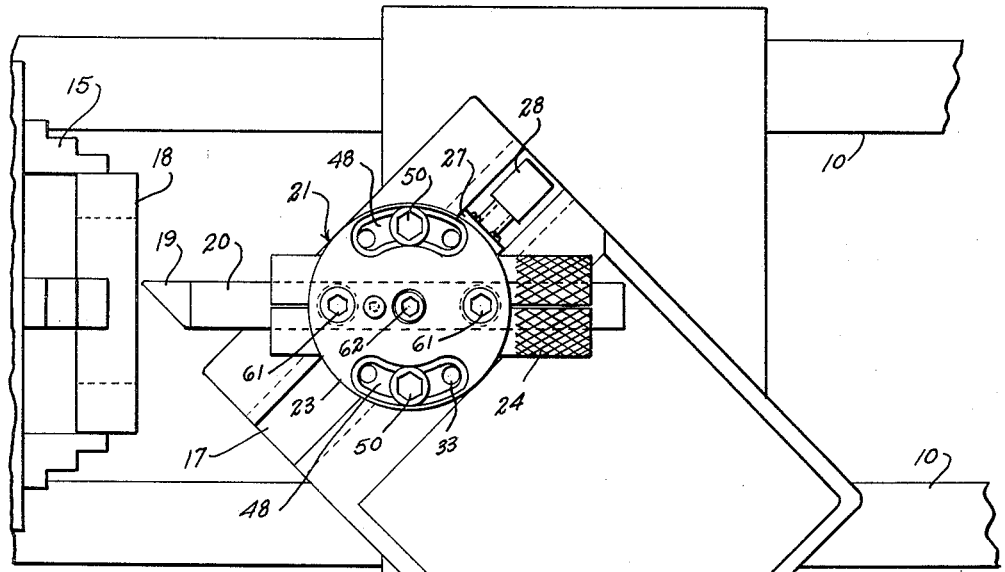
Figure 1 is a top plan view of a fragmentary portion of a conventional lathe showing the application thereto of a tool support illustrative of the invention.

With continued reference to the drawings, and particularly, to Figure 1, the portion of the lathe illustrated includes a longitudinal lathe bed 10 upon which is mounted a cross-way 11 movable longitudinally of the lathe bed by conventional screw shafts or other means, not illustrated, and carrying a cross-slide 12 movable lengthwise of the cross-way 11 and transversely of the lathe bed 10, a compound guide 13 rotatably mounted upon the cross-way slide 12 and carrying a compound slide 14, and a lathe chuck 15 driven by conventional means, not illustrated, to rotate about a rotational axis extending longitudinally of the lathe bed 10.

The compound slide 14 is movable lengthwise of the guide 13 by suitable means including the rotatable handle 16 and is provided with a transverse guideway slot 17 of conventional dovetail or inverted T-shaped cross-section. The compound slide is rotatably mounted on the top of the transverse slide 12 and may be turned to any desired rotational position relative to the transverse slide and the lathe bed 10.

In the arrangement illustrated, the lathe is set up for internally boring a work piece 18 held in the chuck 15. A suitable cutting tool 19 is carried by a boring bar 20 which is supported in a tool support mounted on the compound slide 14 and generally indicated at 21.

As will be later described, in detail, the tool support 21 is so constructed and arranged that the tool may be positioned to bore, face, chamfer and groove the work piece 18 at any desired angle upon movement of the compound slide 14, or the transverse slide 12, or both the compound and transverse slides, as may be found necessary.

As is most clearly illustrated in Figure 4, the tool support 21 comprises a base 22, illustrated in detail in Figure 7, a cylindrical body 23, a split sleeve 24 carrying an eccentric tool-receiving bore extending longitudinally therethrough, a clamping plate 25, a mounting block 26, a split nut 27, and a locking bolt 28.

The base 22 is a flat, plate-like member having substantially parallel top and bottom surfaces and a substantially circular planiform shape, one side of which is flattened, as indicated at 29, for the attachment thereto of the split nut 27. The base plate has a centrally located, generally cylindrical boss 30 extending from one side thereof and provided with a diametrically-transverse tapered hole 31, and a centrally located, cylindrical stud 32 projecting from the opposite or top surface thereof. It also has a plurality of angularly-spaced, internally screw-threaded holes 33 circumferentially arranged about the stud 32 for a purpose which will presently appear.

The split nut 27 comprises a pair of substantially L-shaped halves 34 provided with semi-cylindrical, internally screw-threaded recesses which form, when the two halves are operatively associated, an internally screw-threaded aperture 35 extending longitudinally through the nut substantially parallel to the bottom surface of base plate 22. Each half 34 of the split nut comprises a substantially rectangular portion having an apertured rectangular lug 36 upstanding at one end thereof which lugs overlie the flattened surface 29 of the base plate, as is clearly illustrated in Figures 3 and 4, and are secured thereto by respective screws 37 passing through the lugs and into screw-threaded wells extending inwardly from the flattened edge portion of the base plate. The halves of the split nut are further secured to the base plate by screws passing respectively through holes 38 in the base plate and corresponding holes 39 in the nut halves and dowels extending through holes 40 in the base plate between the two holes of each pair of holes 38 and through corresponding holes 41 in the nut halves, the various screws and the dowels rigidly securing the split nut to the base plate so that the rectangular portion of the nut halves underlie the base plate and are held together to provide the screw-threaded opening 35 for the locking bolt 28.

A slide block 42 is provided with a central aperture receiving the boss 30 depending from the bottom surface of the base plate, with opposite flanges 43 respectively engaging the opposite upper-edge portions of the guideway groove 17 in the compound slide 14 and with tapered holes which register with the tapered hole 31 in the boss 30.

The locking bolt 28 has a head 44 provided with wrench or tool-engaging means 45 which may be in the form of a non-circular socket in the head, an externally screw-threaded cylindrical portion 46 adjacent the head and received in the split nut 27 and a tapered portion 47 at the end of the screw-threaded portion opposite the head. The tapered portion is received in the tapered holes in the block 26 and boss 30 and is operative, when the bolt is threaded inwardly through the nut 27 to displace the block 26 relative to the boss 30 in a manner to clamp the opposite upper-edge portions of the guideway groove 17 between the block flanges 42 and the bottom surface of the base plate 22 to thereby lock the tool support to the compound slide in any desired translatory position of the tool support lengthwise of the guideway groove 17.

The body 23 is preferably in the form of a right cylinder having parallel top and bottom surfaces, the bottom surface engaging the top surface of the base plate 22 and having a centrally-located recess therein receiving the stud 32. A pair of elongated, arcuate slots 48 extend through the body 23 from the top to the bottom surface thereof and at spaced-apart, diametrically-opposed positions, as is clearly illustrated in Figure 2. These slots may have their upper ends surrounded by bearing ridges 49 and respective bolts 50 extend through the slots and are threaded at their bottom ends into corresponding holes 33 in the base plate 22 to secure the body 23 to the base plate, these bolts having at their upper ends heads which overlie the ridges 49 and are provided with respective wrench-receiving sockets 51.

As illustrated in Figure 2, the slots 48 have a length corresponding to the spacing of holes 33 in a manner such that the slots extend over two more of the holes which renders it possible to rotate the body 23 through 360 degrees or a complete revolution relative to the base 22 and secure the body to the base in any position of adjustment within such a complete revolution. The body 23 is provided around its bottom end with degree marks and the base has a reference mark which cooperates with the degree marks to indicate the angular position of body 23, relative to base 22.

The body 23 is further provided with a transverse or diametrical bore 52 having a cylindrical portion of circular cross-sectional shape and an extension 53 at the upper-side thereof which extension has a rectangular cross-sectional shape and provides a recess extending transversely through the body at the top of the cylindrical portion of the bore, a counter-bored aperture 54 centrally located in the top of the body and extending from the top surface into the recess 53, and a pair of internally screw-threaded openings 55 of circular cross-section extending from the top surface of the body to the recess 53 and disposed in diametrically-opposite position one at each side of said openings 55 and between adjacent ends of said slots 48.

The tool-holding sleeve 24 is in the form of a right cylinder having an outside diameter substantially equal to the diameter of the cylindrical portion of bore 52 so that the sleeve is slidably received in the bore. This sleeve is longitudinally divided into two substantially equal parts and is provided with a longtiudinal tool-receiving bore 56, the longitudinal center-line of which is spaced from the longitudinal center-line of the sleeve to provide an eccentric mounting for the tool in the bore of body 23.

The two parts of the sleeve are held together by a pair of spaced-apart screws 57, each of which extends through an opening 58 in one part of the sleeve which opening has a counterbore in each end thereof, and is threaded into an internally screw-threaded opening 59 in the other half of the sleeve which opening is provided with a counterbore in the inner end thereof. The screw head is disposed in the outer counterbore of the opening 58 and a coiled compression spring 60 surrounds each screw within the adjoining counterbores of the openings 58 and 59 to resiliently urge the two parts of the sleeve apart.

The screws 57 are adjusted so that the sleeve may be entered into the bore in the body 23 and so that the springs 60 will force the opposite sides of the sleeve into frictional engagement with the surface of the bore to frictionally hold the sleeve in the bore.

A clamping plate 60 is received in the recess 53 of the bore 52, and has a concave surface opposed to the adjacent surface portion of sleeve 24. Respective screw plugs 61 threaded into the opening 55 bear at their inner ends on the top surface of this clamping plate to force it against the split sleeve to thereby clamp the sleeve in the bore of the body 23 and also rigidly clamp the boring bar 20 in the tool-receiving bore 56 of the sleeve, holding the sleeve in any desired position of eccentric adjustment in the bore 52.

A bolt 62 extends through the counterbored openings 54 in the top portion of body 23 with its head in the counterbore, and is threaded at its lower end into a screw-threaded aperture 63 provided in the plate 60 centrally thereof. In addition to its head, this bolt is provided with a shoulder 64 which bears upon the top surface of the plate and a coiled compression spring 65 surrounds the bolt within the counterbore between the bottom of the counterbore and the bolt head to resiliently urge the plate against the upper surface of the recess 53, the bolt and spring acting to retain the plate 60 in the recess when the sleeve 24 is removed from the body 23.

In operation, the compound slide 14 of the lathe is set to the desired angular relationship to the transverse slide 12, the tool 20 is inserted in the sleeve 24 and the sleeve is inserted in the body 23 which is, in turn, mounted upon the base 22, secured to the compound slide 14 by engagement of the block 26 in the guideway slot 17 of the compound slide. The body 23 is then brought to a condition of approximate rotational adjustment relative to the base 22 and the entire support is moved along the groove 17 until the tool 19 is brought substantially to the desired position relative to the work piece 18. The locking bolt 28 may then be tightened, moving the block 26 relative to the boss 39 to lock the base in the desired position along the guideway slot 17. The rotational adjustment between the body 23 and the base 22 is then perfected and the bolts 50 are tightened to hold the body 23 in the desired position of rotational adjustment upon the base. The tool shaft or bar 20 may now be rotated in the sleeve to bring the cutting point of the tool to the desired position, and, if necessary, the sleeve 24 may be rotated in the body 23 to eccentrically adjust the tool relative to the supporting body, after which the plugs 61 are tightened down on the clamp plate 60 to rigidly clamp the sleeve and boring bar in the body 23 against movement relative thereto.

The improved support thus provides three different ranges of adjustable movement for the tool 19 and, in fact, a fourth range which may be accomplished by moving the bar 20 lengthwise through the sleeve 24, and the support is locked in adjusted position in each of these three ranges of adjustable movement by separate and independent locking means, any one of which may be loosened for adjustment of the tool in the corresponding range of movement without loosening the locking means corresponding to the other two ranges of adjustable movement, or in any way disturbing the adjustment of the tool in the other two ranges. The tool can thus be brought to a condition of adjustment relative to the work piece of micrometer accuracy and securely locked in such adjusted position, and is movable, upon movement of the compound slide 14 in the desired direction, to face, chamfer, or groove the work piece, as may be desired.

Figure 12 illustrates a locking pin construction for releasably securing sleeve 24 in a medial position in which the sleeve axis and the axis of bore 56 are both in a substantially horizontal plane. Tool support 21 has an aperture 70 extending from the top surface thereof to the base 52 between center bolt 62 and one of the clamping bolts 61, and through the clamping plate 25. As illustrated, one side of the split sleeve 24 is provided with a well or recess 71, or with a series of such apertures, centered in a plane perpendicular at the axis of the sleeve to a plane including the axis of sleeve 24 and bore 56. The opposite side of the split sleeve may, however, be provided with a similar recess or with similar recesses, if desired.

A pin 72 is slidably received in aperture 70 and has its inner end receivable in recess 71 in sleeve 24 to hold the sleeve in the above-described position for certain boring, reaming, threading and similar operations. The pin is provided on its upper end with a head 73 by means of which it may be raised to remove its lower end from recess 71, when desired.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A lathe tool support comprising a flat base having a centrally located boss extending from one side and a plurality of angularly spaced holes circumferentially arranged about the center thereof, said boss having a tapered hole extending diametrically therethrough, a cylindrical body mounted on said base and having a pair of oppositely disposed, arcuate slots extending longitudinally therethrough, and a cylindrical bore extending diametrically therethrough between said slots, a respective bolt extending through each slot and threaded into a hole in said base, said bolts holding said body in any desired position of rotational adjustment upon said base, a flanged block having a central aperture receiving said base boss and slidably received in a guideway slot in a lathe slide, said block having tapered holes therein registering with the hole in said boss, an internally screw-threaded nut secured to said base, and a locking bolt having a screw-threaded portion received in said nut and a tapered portion received in the tapered holes in said boss and said block operative to position said block relative to said boss to lock said tool support relative to a lathe slide upon which the tool support is mounted, said cylindrical body having a recess of generally rectangular cross-section at one side of and extending along said diametrical bore, a counter-bored central opening in the top thereof opening into said recess, and a pair of internally screw-threaded holes extending from the top thereof into said recess and disposed one at each side of said central opening, a split, cylindrical sleeve in said bore supporting a lathe tool eccentrically of the longitudinal center-line of said bore, a clamping plate extending through said recess having a concave surface contacting said sleeve, and a centrally-located well therein, a bolt in said central opening threaded into said well and having a head in said counter-bore, a spring between the bottom of said counter-bore and the head of said bolt resiliently urging said clamping plate toward the outer side of said recess, and a set screw in each of said internally screw-threaded holes bearing against said clamping plate and forcing said clamping plate against said sleeve to thereby clamp said sleeve and said tool in adjusted position in said cylindrical body.

2. In the combination of a lathe slide having a guideway groove therein, and a tool-supporting body mounted on said slide; means operative to lock said body in adjusted position along said groove comprising a boss depending from said body into said groove, and having a tapered hole extending transversely therethrough; a block having a central aperture receiving said boss, flanges slidable in the opposite sides of said groove, and tapered holes registering with the tapered hole in said boss; an internally screw-threaded, split nut secured to said body and received in said groove; and a locking bolt having a screw-threaded portion received in said nut and a tapered portion extending through said tapered holes and operative to displace said block relative to said body to clamp the side edges of said groove between said block and said body.

3. A lathe-tool support comprising a flat base having a centrally located boss on one side, a centrally located stud on the opposite side, and a plurality of angularly spaced, internally screw-threaded holes circumferentially arranged about said stud; a body having a base-engaging surface and a central recess in said surface receiving said stud, a pair of spaced apart, oppositely disposed, arcuate slots extending therethrough perpendicular to said surface, a tool-receiving bore extending transversely therethrough between said slots, a top surface opposite said base-engaging surface, and a pair of internally screw-threaded holes extending from said top surface to said bore and located respectively between adjacent ends of said slots for receiving set screws for clamping a tool in said tool-receiving bore; and respective bolts extending through said slots in said body and threaded into said holes in said base to secure said body to said base, the length of said slots and the spacing of said holes providing for rotational positioning of said body relative to said base in any desired position within a complete revolution.

4. A lathe-tool support comprising a body having top and bottom surfaces, a bore extending transversely therethrough and including a cylindrical portion and a rectangular recess extending through said body at the top of said cylindrical portion and a pair of internally screw-threaded holes extending from the top surface thereof to said recess; a longitudinally split cylindrical sleeve in the cylindrical portion of said bore, said sleeve having a longitudinal, tool-receiving bore eccentric of the longitudinal center-line thereof; a clamping plate in the rectangular portion of said sleeve-receiving bore in said body having a concave face adjacent said sleeve; a respective set screw in each of said internally screw-threaded holes in said body operative to force said plate against said sleeve and thereby clamp said sleeve and said tool in said body, said body also having an aperture extending from the top surface thereof into said transverse bore and said sleeve having in one side thereof a recess alignable with said aperture, a pin slidably received in said aperture with its lower end engageable in said recess to hold said sleeve in a predetermined position in said body, and a head on the upper end of said pin for lifting it out of engagement with said recess.

ERNEST E. JOHNSON.

REFERENCES CITED

The following references are of record in the file of this patent:

UNITED STATES PATENTS

| Number | Name | Date |
|--------|------|------|
| 47,876 | Stone | May 23, 1865 |
| 211,378 | Cogswell | Jan. 14, 1879 |
| 437,945 | Swabel | Oct. 7, 1890 |
| 735,138 | Normand | Aug. 4, 1903 |
| 965,893 | Hanson | Aug. 2, 1910 |
| 2,170,246 | Kleiner | Aug. 22, 1939 |
| 2,288,790 | Crone | July 7, 1942 |